United States Patent [19]

Niedermeyer

[11] 4,214,573
[45] Jul. 29, 1980

[54] SOLAR ENERGY COLLECTOR

[76] Inventor: William P. Niedermeyer, 1024 Mt. Mary Dr., Green Bay, Wis. 54301

[21] Appl. No.: 925,778

[22] Filed: Jul. 18, 1978

Related U.S. Application Data

[63] Continuation-in-part of Ser. No. 844,924, Oct. 25, 1977.

[51] Int. Cl.² .............................................. F24J 3/02
[52] U.S. Cl. .................................. 126/438; 126/443; 126/446; 126/450
[58] Field of Search ............... 126/270, 271, 438, 443, 126/446, 448, 450; 237/1 A; 60/641; 350/288, 293; 165/183

[56] References Cited

U.S. PATENT DOCUMENTS

| 2,434,519 | 1/1948 | Raskin | 165/183 |
| 3,048,375 | 8/1962 | Walker | 126/270 |
| 3,321,012 | 5/1967 | Hervey | 126/271 |
| 4,003,366 | 1/1977 | Lightfoot | 126/271 |
| 4,011,855 | 3/1977 | Eshelman | 126/271 |
| 4,027,653 | 6/1977 | Meckler | 126/271 |
| 4,059,094 | 11/1977 | de Mendoza | 126/271 |
| 4,090,493 | 5/1978 | Kneer | 126/270 |
| 4,099,516 | 7/1978 | Caulier | 126/271 |
| 4,119,085 | 10/1978 | Knowles et al. | 237/1 A |

Primary Examiner—Carroll B. Dority, Jr.
Assistant Examiner—Larry Jones
Attorney, Agent, or Firm—Francis J. Bouda

[57] ABSTRACT

Apparatus for the method of collecting, concentrating, and transmitting solar energy including one or more reflector surfaces for directing the solar rays to a focus area, absorption means disposed at least in part in said focus area, at least one heat transfer conduit in close proximity to but outside the focus area, said absorption means and said heat transfer conduit being operatively connected.

2 Claims, 9 Drawing Figures

SOLAR ENERGY COLLECTOR

BACKGROUND OF THE INVENTION

This is a continuation-in-part of my copending application, Ser. No. 844,924 filed Oct. 25, 1977.

This invention relates to a solar energy collecting means, and more particularly to a collector which utilizes the principles of heat conduction to a heat transfer pipe connected to the collection-absorption part of the collector.

In the preferred embodiment, an absorption means having a plurality of generally vertical planar sides is disposed between two reflective surfaces in order to absorb reflected or reflected-concentrated solar rays.

Use of a central absorbing member in combination with parabolic reflecting surfaces is taught in U.S. Pat. Nos. 4,024,852, 4,038,964 and 3,321,012. These patents describe central planar absorbers having either a fluid tubular member arranged circuituously inside a central opening (U.S. Pat. No. 4,038,964) or a plurality of fluid conduits inside the central opening (U.S. Pat. No. 4,024,852).

U.S. Pat. No. 3,321,012 shows the advantageous use of a similar planar absorber, but uses a central cavity in the absorber as a fluid passage in combination with curvilinear reflective surfaces on each side of the absorber.

In all three patents referenced above, the absorber itself becomes, or contains therein, one or more fluid passages that surround the heat transfer medium.

In the instant invention, the solar ray absorber means can be a thin metallic strip or a metallic piece of greater cross sectional area, but in either case, the absorption coated solar ray absorber is monolithic and does not have fluid conduits therein. In this invention, the lower edge of the absorber is connected with a fluid conveying member that is mounted in butting relationship and therefore adjacent to and below the major portion of the "effective" absorption area. In another embodiment, the fluid conveying member can be mounted above the major portion of the "effective" absorption area, or there can be a fluid converging member at each end of the absorber.

Construction according to the present invention has distinct advantages over prior art teachings, for example, the present invention can utilize a very small diameter tubular member below the single planar absorber. The primary benefit of using a monolithic planar member resides in the fact that commercially available strip stock or thin bar stock can be used for solar ray absorption without further processing except for coating and connecting it to the heat transfer tube. Placement of the planar absorber centrally of the adjacent reflective surfaces maximizes the incidence of impinging solar rays over a wide spectrum of daily solar angles.

It is noted that the absorber length of the present invention is most effective when its length equals the axial length of the reflective surface, thereby defining the best possible cost relationship between reflectors and absorbers. The beneficial geometric relationship of a thin rectangular strip or bar minimizes deflection of the absorber and has sufficient bend resistance to support small diameter tubing since the absorber and tubing will be operatively connected along an edge portion of the planar absorber member.

While the preferred embodiment shows the tubular heat transfer pipe connected to the bottom edge of the planar absorber, it is within the scope of this invention that the fluid carrying pipe can be positioned above the planar absorber and connected thereto at the upper edge without any measureable difference in the concentration ratio as opposed to location at the bottom edge of the absorber. When placed at the top of the absorber, the fluid carrying pipe can be positioned above the zenith of the reflector surfaces thereby minimizing any re-reflection of rays from the external periphery of the pipe which condition would occur whenever a true parabolic reflector surface is not used. A pipe connected to the absorber plate along a top edge that is slightly above the zenith of the reflector surfaces would be the most effective construction for use with any non-parabolic surface.

If two pipes are used, two separate fluids may be utilized and independently heated.

Another advantage of using small diameter tubular fluid carrying pipes is the reduction in circumferential area that must be sealed to prevent fluid leakage where the pipes are inserted into manifold members.

According to U.S. Pat. No. 3,321,012, fluid carrying tubes with a central flattened portion could be used as absorbers, however, in order to define an absorber that is effective from the nadir to the zenith of the reflector surfaces, a much larger diameter tube must be used with the resultant disadvantage that a significant length is involved in transition from the flattened to the circular cross section.

In another embodiment of the present invention, the substantially planar absorber can be rotated about the heat transfer pipe, said transfer pipe being fixedly and non-rotatably secured to the end manifolds, this arrangement minimizing reflection of rays uselessly into space, particularly when the solar angle is low.

In another embodiment, an evacuated oblongated transparent encasement can enclose the coacting absorber-heat transfer pipe.

OBJECT OF THE INVENTION

The primary object of the invention is to provide a monolithic planar absorber means and effective heat transfer to a small fluid conveying pipe in close proximity thereto without restricting maximum impingement of solar rays on the effective absorption plane.

Another object of this invention is to connect the "full range" absorption means and the heat transfer pipe in a manner that minimizes the distance heat must travel and maximizes efficient heat transfer.

Another object of this invention is to provide heat absorbers without limiting the absorber area and arranging same for pivotable mounting about a tubular fluid conveying member.

With the above and other objects in view, more information and understanding of the present invention may be achieved by reference to the following detailed description.

DETAILED DESCRIPTION

For the purpose of illustrating the invention, there is shown in the accompanying drawings a form thereof which is at present preferred, although it is to be understood that the various instrumentalities of which the invention consists can be variously arranged and organized and that the invention is not limited to the precise arrangements and organizations of the instrumentalities as herein shown and described.

In the drawings, wherein like reference characters indicate like parts:

Figure 5:
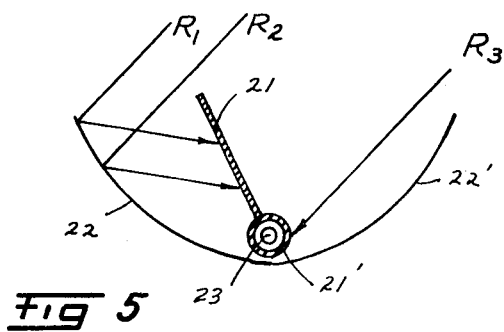
FIG. 5 is an end view of a collector showing a combination absorber and heat conducting extension that permits the absorber to be inclined from the vertical central plane.
Figure 7:
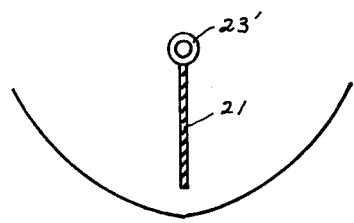

FIG. 7, similar to FIG. 5, shows another embodiment of the invention.

Figure 8:
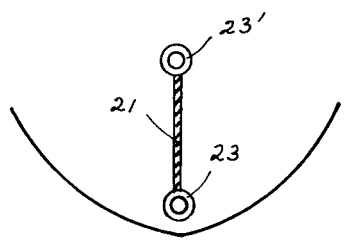

FIG. 8, similar to FIG. 5, shows another embodiment of the invention.

Figure 6:
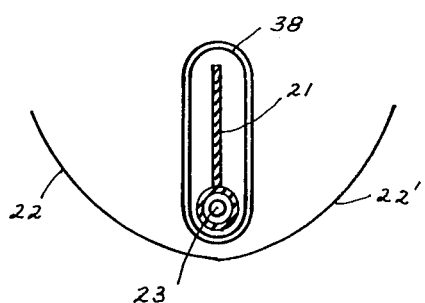
FIG. 6 is an end view showing the working elements in a transparent enclosure.
Figure 9:
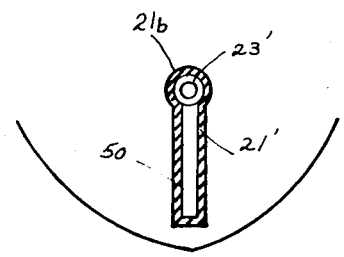

FIG. 9, similar to FIG. 6, shows another embodiment of the invention.

Figure 1:
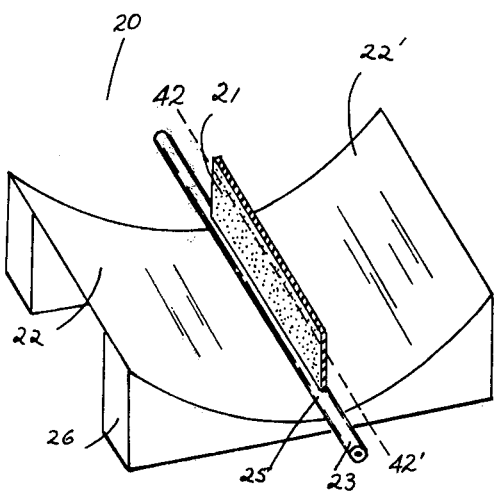
FIG. 1 is a perspective view showing arrangement of the principle working members.

FIG. 1 shows the working relationship and the basic operating principles of this invention.

A solar energy collector 20 consists of three principle members arranged to perform the functions of solar ray reflection, absorption, and heat transfer.

Absorber 21 is a monolithic metallic member having an absorptive coating on both sides. In the preferred embodiment of FIG. 1, the absorber 21 is arranged coincident with a central plane that is equidistant from reflector surfaces 22 and 22'. In other embodiments (see FIG. 5), the absorber can be advantageously positioned at some angle from the central plane.

Solar rays are collected as heat by absorber 21 and the heat is transferred to a fluid-carrying member 23. In FIG. 1, the heat absorber 21 is shown in edge butting relationship, and connects with, the heat transfer means 23, however, member 21 could be arranged in overlapping contacting relationship with the heat transfer pipe as at point 25 of FIG. 1, said point being in a horizontal plane that is coincident with the horizontal centerline of heat transfer pipe 23. Member 26 is a typical support piece for the reflector surfaces 22, 22', etc.

In FIG. 1, the focal line 42-42' for reflector 22-22' is shown in a typical location above the mid-point of a centrally located planar absorbing member 21.

Figure 2:
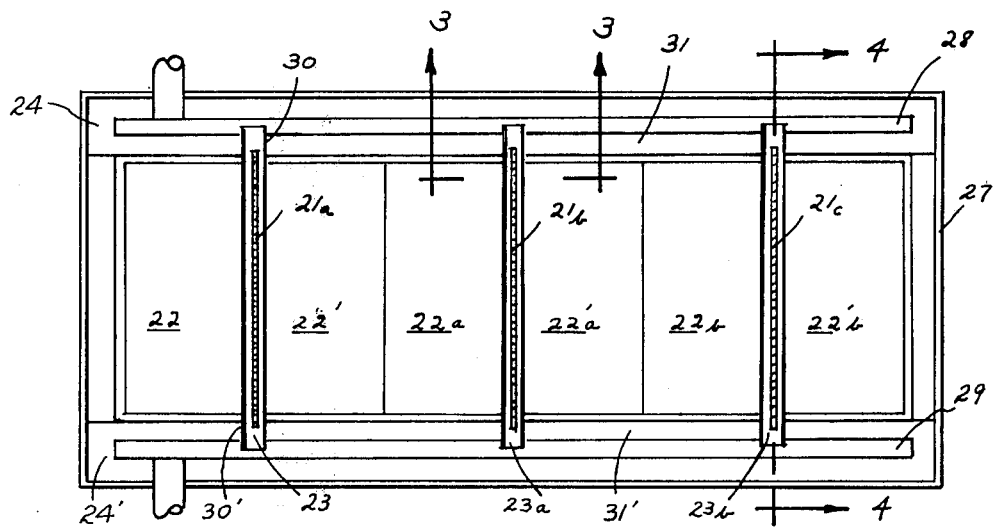
FIG. 2 is a top plan view of the working members shown in FIG. 1, said elements being mounted in working relationship with a manifold arrangement.
Figure 3:
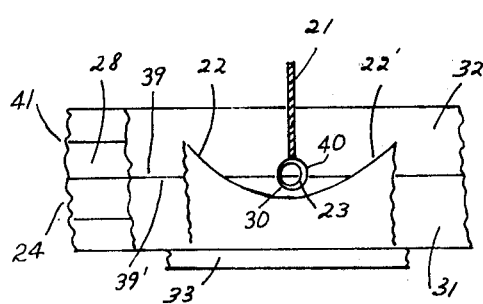
FIG. 3 is a cross sectional view along lines 3—3 of FIG. 2.

FIG. 2 shows the principle elements in proper working relationship and contained within housing member 27 which includes grooves 28 and 29 shown in the bottom manifold members 24 and 24' (top manifold portions removed for clarity). In FIG. 2, the ends of fluid carrying pipes 23, $23_a$, and $23_b$ are supported by semicircular saddles or recesses (as at 30 and 30') which are formed in the inside wall 31 and 31' adjacent the grooves conduits 28 and 29 respectively. For clarity of illustration, FIG. 2 only shows the bottom portion of a two part manifold structure. In FIG. 3, the upper portion 32 of the two-part manifold shows the "surface fitting relationship", as at 39 and 39', including an inverted semi-circular saddle or recess 40 which coacts with saddle 30 to form a circular opening through the inside walls 31 and 31' of manifold parts 24 and 41.

FIG. 3 also shows the "working" elements 21, 22, and 23 of a typical collector assembly with extending portion 23 being securely held by contacting saddles 30 and 40, said saddles being respectively recessed in the inside wall 31 of lower part 24, and the inside wall 32 of upper part 41.

In effect, members 24 and 41 are inverted "U" shaped members that are closed at the ends, one of which is inverted to form side seals at the extended flat portions of each "U" (as at 39 and 39'). The "working" assembly 21, 22, and 23 is a subassembly independent of the manifold housing except that the ends of heat transfer pipe 23 are supported therein, however, thus cooperatively joined, the "working" assembly and the housing-manifold assembly can be supported by a common sub-planar surface 33.

Figure 4:
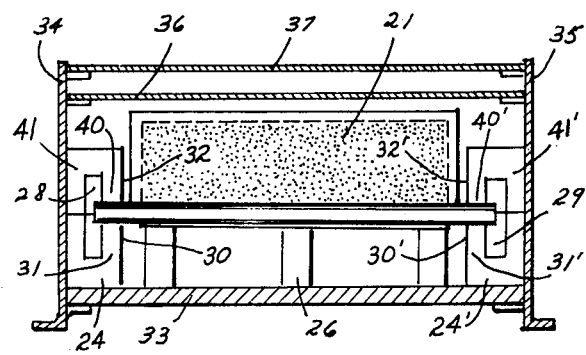
FIG. 4 is a cross sectional view along lines 4—4 of FIG. 2.

FIG. 4 shows an end view of the "working" assembly installed in cooperating relationship with the manifold members having a common sub-planar support 33, and all parts housed within frame members 34 and 35 etc. Top glazing pieces 36 and 37 complete the collector panel. In FIG. 4, the shaded portion of an extended absorber shows the "effective" absorption zone.

In the embodiment of FIG. 5, the absorber 21 is extended to include a concentric circular portion 21' that encloses heat transfer pipe 23 along at least a portion of its unsupported length. This arrangement permits the absorber to be mounted at an angle from the central plane, or permits it to be pivoted about the axis of the heat transfer pipe 23.

In FIG. 5, the absorber 21 is tilted to show that rays between $R_1$ and $R_2$ would impinge the absorber surface even when solar angles are low, albeit a lower concentration ratio under these conditions.

FIG. 6 shows the absorber planar member and the heat transfer pipe contained within an enclosure 38.

FIG. 7 shows how the pipe 23' could be affixed to the upper end of the absorber 21 while FIG. 8 illustrates how pipes 23 and 23' may be affixed to both ends of the absorber 21.

FIG. 9 illustrates how a pipe 23' can have a rectangular planar-sheet-metal absorber 21' fastened around it so as to be pivotal about the pipe and also to provide a recess 50. This permits close contact between the absorber, the pipes and any material in the recess.

It is understood that the present invention may be embodied in other specific forms without departing from the spirit or special attributes hereof, and it is therefore desired that the present embodiments be considered in all respects as illustrative, and therefore not restrictive, reference being made to the appended Claims rather than to the foregoing description to indicate the scope of the invention.

Having thus described my invention, what I claim as new and desire to protect by Letters Patent are the following:

1. Apparatus for collecting, concentrating and absorbing solar rays and transferring solar energy to a heat transfer fluid, including
   (a) an elongated parabolic reflector having a nadir and a focal plane
   (b) the focal plane disposed above the nadir
   (c) a focal area in the focal plane
   (d) an absorbing means with planar sides disposed at least in part in the focal area above the nadir,
   (e) a tubular conveyor affixed to an edge of the absorber and disposed above the reflector
   (f) a pair of elongated fluid conducting manifolds each formed of mated upper and lower members said manifolds positioned at opposite ends of the reflector with the ends of said conveyor sealingly positioned and supported in mated recesses disposed along the length of said manifold members, wherein the fluid conducting manifolds support the tubular conveyor at each end of the reflector and conduit a heat transfer fluid to and way from the conveyors.

2. The apparatus of claim 1 wherein said manifolds are slit along a plane coincident with said conveyor and the recesses are semi-circular and disposed along said slit in opposition to each other whereby to receive rotatably therein the ends of the said conveyor.

* * * * *